US006953052B2

(12) United States Patent
Lehtonen

(10) Patent No.: US 6,953,052 B2
(45) Date of Patent: Oct. 11, 2005

(54) FUEL SYSTEM SHUT-OFF VALVE

(75) Inventor: Kai Lehtonen, Vaasa (FI)

(73) Assignee: Wartsila Technology Oy AB, Helsinki (FI)

( * ) Notice: Subject to any disclaimer, the term of this patent is extended or adjusted under 35 U.S.C. 154(b) by 12 days.

(21) Appl. No.: 10/179,759

(22) Filed: Jun. 24, 2002

(65) Prior Publication Data

US 2003/0000581 A1 Jan. 2, 2003

(30) Foreign Application Priority Data

Jun. 27, 2001 (FI) ............................................. 20011379

(51) Int. Cl.[7] .......................... F16K 15/02; F02M 63/02

(52) U.S. Cl. ....................... 137/517; 137/498; 137/509; 137/540; 123/456; 123/198 DB; 251/120

(58) Field of Search ................................ 123/456, 460, 123/467, 198 DB; 137/517, 494, 498, 509, 538, 540; 251/118, 120

(56) References Cited

U.S. PATENT DOCUMENTS 922,578 A * 5/1909 Gries ......................... 137/517
2,247,421 A * 7/1941 Tabb et al. ................. 123/446
3,735,777 A * 5/1973 Katzer et al. ............ 137/514.5
3,780,716 A * 12/1973 Fenne ........................ 123/447
4,589,393 A * 5/1986 Jourde et al. ............... 123/460
5,365,974 A * 11/1994 Maravic ..................... 137/493
5,511,528 A 4/1996 Iwanaga et al.
5,577,479 A * 11/1996 Popp .......................... 123/458
6,357,415 B1 * 3/2002 Mori ................... 123/198 DB
6,374,802 B1 * 4/2002 Boecking .................... 123/446
6,374,852 B1 * 4/2002 Olivas ..................... 137/493.9
6,668,802 B2 * 12/2003 Kiowsky et al. ............ 123/467

FOREIGN PATENT DOCUMENTS

DE 197 47 092 4/1999

* cited by examiner

*Primary Examiner*—Ramesh Krishnamurthy
(74) *Attorney, Agent, or Firm*—John Smith-Hill; Smith-Hill and Bedell

(57) ABSTRACT

A fuel system shut-off valve includes a valve body bounding a fuel space, the valve body having an inlet opening and an outlet opening communicating with the fuel space. A piston assembly in the fuel space includes a main piston member that is movable relative to the valve body and an auxiliary piston member that is movable relative to the main piston member. The piston assembly either allows or prevents fuel flow through the valve from the inlet opening towards the outlet opening depending on the position of the auxiliary piston member. A force member urges the piston assembly towards the inlet opening.

17 Claims, 3 Drawing Sheets

FUEL SYSTEM SHUT-OFF VALVE

BACKGROUND OF THE INVENTION

This invention relates to a fuel system shut-off valve.

It is conventional to use a so-called common rail storage injection system in connection with an internal combustion engine. In such a system, fuel under injection pressure is injected into a combustion chamber of the engine by controlling an injection valve. If the injection valve is defective, this enables the situation in which fuel may leak in uncontrolled fashion into the combustion chamber. To prevent this, the publications U.S. Pat. No. 3,780,716 and WO 95/17594 propose a shut-off valve for limiting the fuel flow volume. The shut-off valve has a cylinder space which contains a piston provided with a spring load acting against the fuel flow direction in an injection situation. In normal operation the fuel amount needed for each injection corresponds to the volume displaced by the piston movement. If for some reason the shut-off valve continues to leak, the piston moves to an extreme position in which it shuts the flow off.

In publication GB 2317922 there has been disclosed another shut-off valve for limiting the flow volume. In the initial situation, the pressure acts upon a smaller surface area on the fuel admission side in which case, at a given pressure, the force is naturally smaller being in proportion to the surface area acted upon. However, a disadvantage of this solution is the absolute tightness requirement and consequently it is very sensitive in regard to the fuel quality. If the sealing surface of this smaller surface area leaks, the solution does not work and the pressure is applied to the entire surface area and the piston may move to an extreme position in which it closes the flow. Especially in a large power plant or marine engine the fuel can be such that the solution does not function reliably enough.

Also, the prior art flow shut-off valves have generally problems related to situations in which the fuel viscosity is high, for example when heavy fuel oil is used and/or when the fuel temperature before starting the engine is lower than the normal operating temperature. Consequently, the equalization of the fuel pressure over the piston does not occur rapidly enough and the piston may move to an extreme position and close the injection connection.

An object of the present invention is therefore to provide a fuel system shut-off valve by which the prior art disadvantages are avoided. An objective of the present invention is especially to provide a shut-off valve by which the unintentional closure on starting phase can be avoided.

SUMMARY OF THE INVENTION

According to the present invention there is provided a fuel system shut-off valve comprising a valve body bounding a fuel space, the valve body having an inlet opening and an outlet opening communicating with the fuel space, a piston assembly in the fuel space and including a main piston member that is movable relative to the valve body and an auxiliary piston member that is movable relative to the main piston member, the piston assembly either allowing or preventing fuel flow through the valve from the inlet opening towards the outlet opening depending on position of the auxiliary piston member, and a force member urging the piston assembly towards the inlet opening.

In the preferred embodiment of the invention, the main piston member and the auxiliary piston member have, on the inlet opening side, a first surface area and a second surface area, respectively, bordering the fuel space and the second surface area, formed by the auxiliary piston member, is smaller than the first surface area, formed by the main piston member. The auxiliary piston member is arranged to be movable for providing the closing and opening of the flow connection between the inlet and outlet openings. For this purpose the auxiliary piston member is provided with a sealing surface.

In the preferred embodiment of the invention, the force member applies force to the auxiliary piston member and this influences the relative positions of the main piston member and the auxiliary piston member. Accordingly, the two piston members are advantageously influenced by a common force member.

The fuel space of the shut-off valve is preferably cylindrical and the diameter of the main piston member corresponds substantially to the fuel space diameter. The main piston member has a bore in the direction of its longitudinal axis, and the auxiliary piston member is movably arranged in the bore of the main piston member.

The counter surface of the auxiliary piston member sealing surface may be arranged in connection with the outlet opening or in connection with the main piston member, depending on the way the shut-off valve is implemented.

Several advantages are realized using the preferred embodiment of the invention. Firstly, the operation is reliable on starting of the engine. The operation pressure of the shut-off valve auxiliary piston member can easily be dimensioned as desired and, mainly, the operation of the shut-off valve depends only on the pressure. Further, the fuel qualities have only a slight effect on the operation and the presence of possible dirt particles in the fuel does not affect the starting operation.

BRIEF DESCRIPTION OF THE DRAWINGS

The invention is explained below by way of example only, with reference to the accompanying schematic drawings, in which.

DETAILED DESCRIPTION

Figure 1:
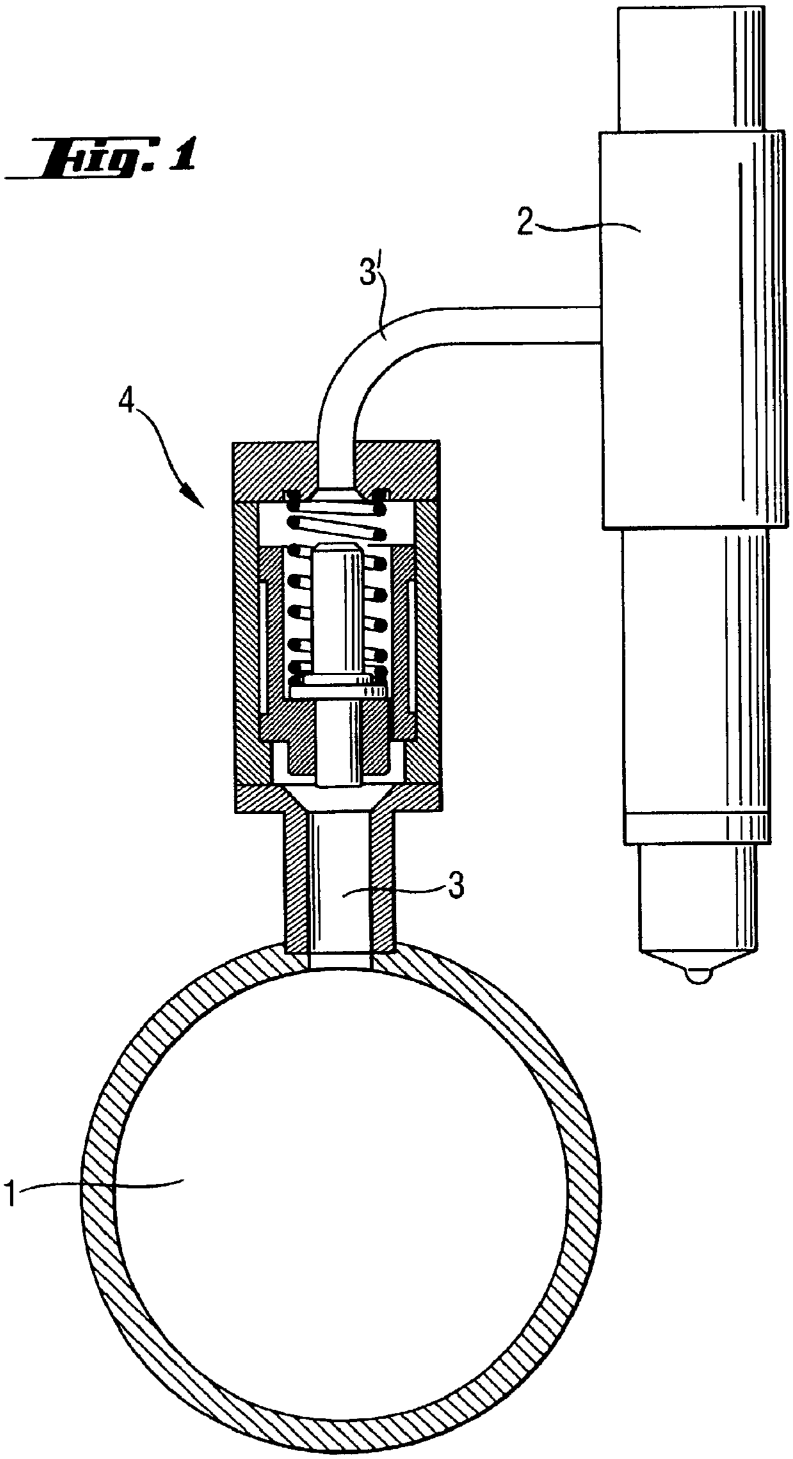
FIG. 1 shows how the shut-off valve embodying the invention is applied to a fuel injection system.

As shown very schematically in FIG. 1, the shut-off valve 4 can be adapted to a common rail fuel storage injection system. The common rail storage injection system is conventional and is not described here in detail. The common rail storage injection system includes as its principal components a common rail storage 1, in which there is fuel under high pressure to be injected into the engine and with which the injection valves 2 (only one of which is shown in FIG. 1) are in fluid flow connection for dosing fuel to the cylinders (not shown). From the common rail storage 1 there is arranged a fuel channel ductwork 3, 3' for the injection valve 2. A sufficient pressure is maintained in the common rail storage during the operation to provide an adequate injection pressure to the injection valves 2. Each injection valve 2 comprises control means (not shown) for controlling the injection independently. In the fuel channel ductwork 3, 3' there is arranged a shut-off valve 4, the operation of which is explained in the following by referring to FIGS. 2–5.

Figure 2:
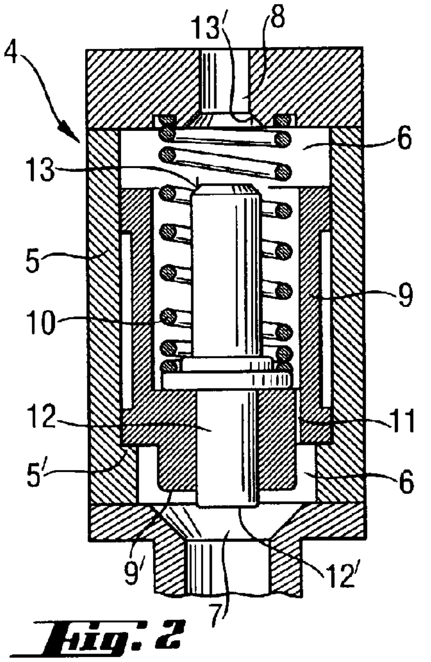
FIG. 2 shows a shut-off valve embodying the invention in its basic position.

The shut-off valve is shown in its initial state in FIG. 2. The shut-off valve includes a body part 5 defining a cylindrical fuel space 6. The fuel space has an inlet opening 7 and an outlet opening 8 for the fuel. In the fuel space 6 of the body part 5 there is fitted a piston assembly 9 comprising an outer or main piston and an inner auxiliary piston 12. A narrow passage or throttle 11 passes through the outer piston and connects the regions of the fuel space 6 on different sides of the piston assembly 9 with each other. Depending on the position of the piston assembly 9, fuel may either flow through the shut-off valve from the inlet opening to the outlet opening or the fuel flow may be prevented. The shut-off valve 4 further comprises a spring 10, which urges the piston assembly 9 against a shoulder 5' of the body part 5 as shown in FIG. 1. In normal running conditions between injections, the shut-off valve 4 is in the position of FIG. 2.

Figure 3:
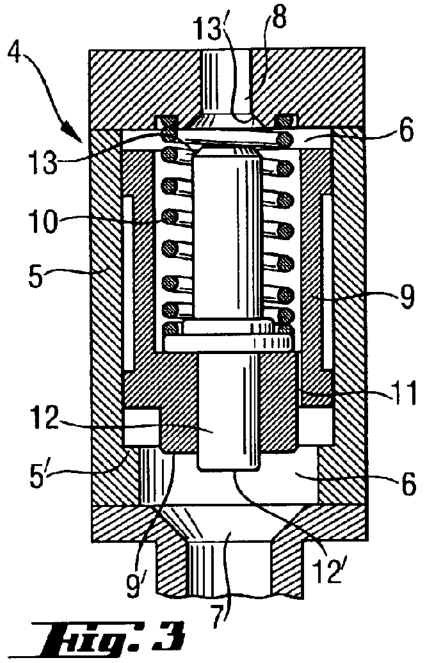
FIG. 3 shows the shut-off valve according to FIG. 2 during the injection.

When the injection valve 2 starts the injection during the normal operation, a pressure difference develops over the shut-off valve 3, in other words between the inlet opening 7 and the outlet opening 8, in which case the piston assembly 9 moves upwards until the injection stops and the pressure difference equalizes. This situation is shown in FIG. 3. In this situation the amount of the fuel to be injected is equivalent to the volume displaced by the movement of the piston assembly 9 in the fuel space 6.

The auxiliary piston 12 is movably arranged in connection with the main piston. The main piston has an area 9' limiting the fuel space 6 on the inlet opening 7 side of the fuel space 6, whereupon the fuel space pressure acts and in normal operation the auxiliary piston 12 moves with the main piston without relative movement of these two members.

Figure 4:
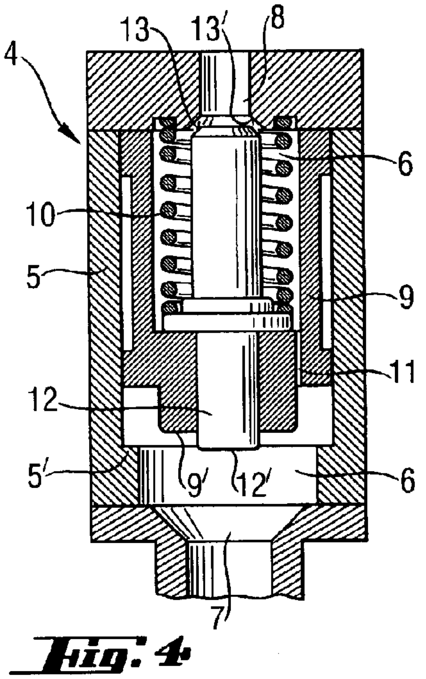
FIG. 4 shows the shut-off valve according to FIG. 2 in its second extreme position.
Figure 5:
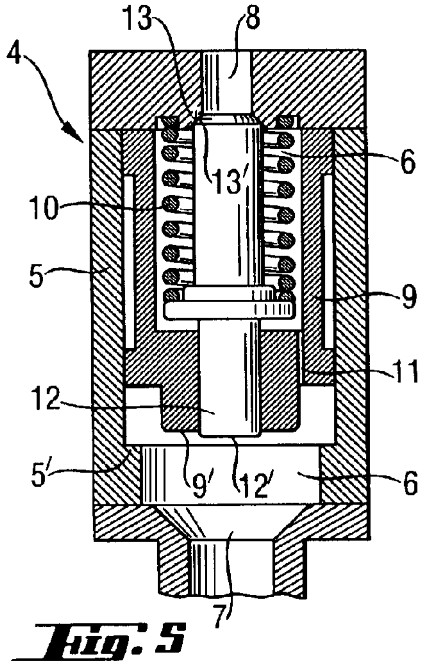
FIG. 5 shows the closed shut-off valve according to the FIG. 2.

In the event that the injection valve 2 leaks or does not close up for some reason after the injection, the common rail storage pressure pushes the piston assembly 9 to the extreme position shown in FIG. 4. In this position of the piston assembly 9 the flow into the injection valve 2 is strongly restricted, because the entire flow goes via the throttle 11. The pressure difference across the piston assembly 9 increases and when it reaches a specific limit, the auxiliary piston 12 moves relative to the main piston and the sealing surfaces 13, 13' close up and shut the flow off, which situation is shown in FIG. 5. Here the counter surface 13' of the auxiliary piston 12 sealing surface 13 is arranged in connection with the outlet opening 8. This mode of operation occurs because the auxiliary piston 12 has an area 12' bordering a space in the section on the fuel space 6 inlet connection 7 side and this area 12' is smaller than the corresponding area 9' of the main piston, in which case primarily a common movement of the main piston and the auxiliary piston 12 takes place and only when the pressure difference has exceeded a certain limit, such that the piston assembly 9 reaches the position shown in FIG. 4, does the auxiliary piston 12 move relative to the main piston. Consequently, the pressure moving the auxiliary piston 12 is directed only at the area determined by its diameter and the movement requires a greater pressure than the pressure enabling the movement of the whole piston assembly 9.

The shut-off valve 4 operates on starting of the engine, for example in a heavy fuel application, as follows. When the fuel circulation is launched before the engine is started up, the pressure of the fuel system effects the inlet opening 7. In this initial situation the outlet opening 8 side can be almost free of pressure or even full of air. In the next phase the piston assembly 9 moves to the position illustrated in FIG. 4, in other words to its second extreme position. It may be presumed, for example, that the pressure of the fuel system is around 7 bar. The shut-off valve 4 can be dimensioned for example so that the pressure difference needed for moving the auxiliary piston 12 to the position shown in FIG. 5 is 25 bar. This means, in practice, that the shut-off valve 4 stays open and the region of the fuel space 6 on the outlet opening 8 side and the ducting 3' downstream of the shut-off valve are filled from the common rail storage injection system. The pressure at the outlet opening 8 increases. When the pressures at the inlet opening 7 and the outlet opening 8 are sufficiently equalized, the piston assembly 9 of the shut-off valve moves to the position illustrated in FIG. 2 and the engine can be started without problems. This way the throttle 11 can be dimensioned only according to the desired return speed of the piston assembly 9 (in the normal situation when the engine is running). If there is for example a pipe breakage on the outlet opening 8 side of the shut-off valve when the engine is operating, the shut-off valve closes up immediately.

Figure 6:
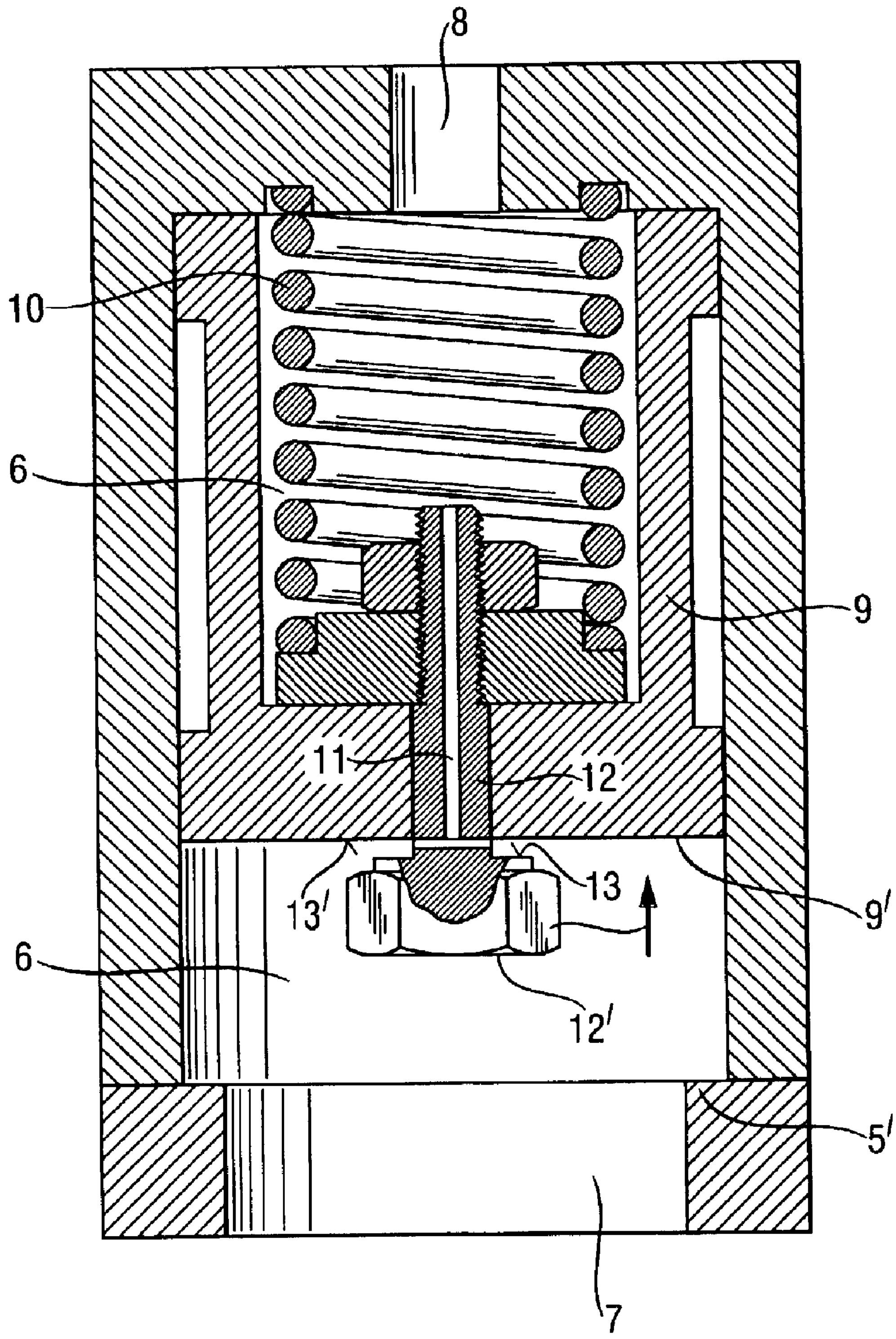
FIG. 6 shows another shut-off valve embodying the invention.

Another shut-off valve embodiment is shown in FIG. 6. This embodiment corresponds otherwise to the one represented in FIGS. 2–5, but the auxiliary piston 12 has been arranged differently to function with the main piston itself as flow closing means. In this embodiment the auxiliary piston 12 fitted in the bore of the main piston includes a threaded portion that is in threaded engagement with a spring retainer and a lock nut, whereby the auxiliary piston is fixed relative to the spring retainer. The auxiliary piston 12 also has an enlarged head 12'. The channel 11 passes through the auxiliary piston 11 and opens at one end into the region of the fuel space 6 on the outlet side of the main piston, and at the other end into the region of the fuel space 6 on the inlet side of the main piston. Now, if the pressure difference across the piston assembly 9 exceeds a specific limit, the auxiliary piston 12 moves towards the outlet connection, in which case the sealing surfaces 13, 13' end up against each other. Here the movement in question is just about to take place. In the embodiment shown in FIG. 6, the counter surface 13' of the auxiliary piston sealing surface 13 is arranged in connection with the piston assembly 9.

The invention is not limited to the embodiments shown, but several modifications of the invention are reasonable within the scope of the attached claims.

What is claimed is:

1. A fuel system shut-off valve comprising:

a valve body bounding a fuel space, the valve body having an inlet opening and an outlet opening communicating with the fuel space, a piston assembly in the fuel space and including a main piston member that is movable relative to the valve body and an auxiliary piston member that is movable relative to the main piston member, the piston assembly either allowing or preventing fuel flow through the valve from the inlet opening towards the outlet opening depending on position of the auxiliary piston member, wherein the volume of fuel that is allowed to flow is equivalent to the volume displaced by movement of the piston assembly, and a force member urging the piston assembly towards the inlet opening, wherein the force member applies force to the auxiliary piston member and the auxiliary piston member transfers force applied by the force member to the main piston member.

2. A fuel system shut-off valve according to claim 1, wherein the piston assembly either allows or prevents fuel flow through the valve from the inlet opening towards the outlet opening depending on position of the auxiliary piston member relative to the valve body.

3. A fuel system shut-off valve according to claim 1, wherein the piston assembly either allows or prevents fuel flow through the valve from the inlet opening towards the outlet opening depending on position of the auxiliary piston member relative to the main piston member.

4. A fuel system shut-off valve according to claim 1, wherein the piston assembly divides the fuel space into an inlet region and an outlet region, the main piston member has a first area bounding said inlet region and the auxiliary piston member has a second area bounding said inlet region, and said second area is smaller than said first area.

5. A fuel system shut-off valve according to claim 1, wherein the auxiliary piston member has a sealing surface for engaging the valve body to prevent fuel flow.

6. A fuel system shut-off valve according to claim 5, wherein the valve body has a counter surface that surrounds the outlet opening and is engaged by the sealing surface of the auxiliary piston member for preventing fuel flow through the valve.

7. A fuel system shut-off valve according to claim 1, wherein the auxiliary piston member has a sealing surface and the main piston member has a counter surface that is engaged by a sealing surface of the auxiliary piston member to prevent fuel flow.

8. A fuel system shut-off valve according to claim 1, wherein the main piston member is fitted slidably in the fuel space and is formed with a passage, the auxiliary piston member is fitted slidably in said passage and is formed with a throttle passage for allowing fuel to flow from an inlet region of the fuel space to an outlet region of the fuel space, and fuel flow through the throttle passage is either allowed or prevented depending on position of the auxiliary piston member relative to the main piston member.

9. A fuel system shut-off valve according to claim 8, wherein the main piston member has a counter surface that surrounds said passage in the main piston member and is engaged by the sealing surface of the auxiliary piston member for preventing fuel flow through said throttle passage.

10. A fuel system shut-off valve according to claim 1, wherein the main piston member is fitted slidably in the fuel space, the main piston member is formed with a passage, and the auxiliary piston member is fitted slidably in said passage.

11. A fuel system shut-off valve according to claim 1, wherein the piston assembly divides the fuel space into an inlet region and an outlet region and the main piston member is formed with a throttle passage allowing fuel to flow between the inlet region and the outlet region.

12. A fuel system shut-off valve according to claim 11, wherein the valve body has a counter surface that surrounds the outlet opening and is engaged by the sealing surface of the auxiliary piston member for preventing fuel flow through the valve.

13. A fuel system shut-off valve according to claim 1, wherein the piston assembly divides the fuel space into an inlet region that is upstream of the piston assembly and an outlet region that is downstream of the piston assembly, the main piston member has a first area bounding said inlet region, the auxiliary piston member has a second area bounding said inlet region, and said second area is smaller than said first area.

14. A fuel system shut-off valve according to claim 13, wherein the valve body has a seat that surrounds the outlet opening, the auxiliary piston member has a sealing surface for engaging the seat of the valve body for preventing fuel flow through the valve, and the outlet region of the fuel space is upstream of the outlet opening.

15. A common rail fuel injection system for an internal combustion engine, the fuel injection system comprising a common rail for supplying fuel under pressure, a fuel injection valve for injecting fuel under pressure into a combustion space of the engine, and a fuel shut-off valve according to claim 1 connected between the common rail and the fuel injection valve, wherein in the event that the fuel injection valve injects a volume of fuel into the combustion space of the engine, the piston assembly moves towards the outlet opening by a distance such that the piston assembly displaces a volume equivalent to the volume of fuel that is injected.

16. A fuel system shut-off valve comprising:

a valve body bounding a fuel space, the valve body having an inlet opening and an outlet opening communicating with the fuel space, a piston assembly in the fuel space and including a main piston member that is movable relative to the valve body and an auxiliary piston member that is movable relative to the main piston member, the piston assembly either allowing or preventing fuel flow through the valve from the inlet opening towards the outlet opening depending on position of the auxiliary piston member, and a force member urging the piston assembly towards the inlet opening, and wherein the main piston member is movable relative to the valve body between a first end position and a second end position, the first end position being nearer than the second end position to the outlet opening, the auxiliary piston member is movable relative to the main piston member when the main piston member is in its first end position, the piston assembly prevents fuel flow through the valve from the inlet opening towards the outlet opening when the main piston member is in its first end position and the auxiliary piston member is in an advanced position relative to the main piston member and allows fuel flow through the valve from the inlet opening towards the outlet opening when the auxiliary piston member is in a retracted position relative to the main piston member, and the force member urges the auxiliary piston member towards the retracted position.

17. A fuel system shut-off valve comprising:

a valve body bounding a fuel space, the valve body having an inlet opening and an outlet opening communicating with the fuel space, a piston assembly in the fuel space and including a main piston member that is movable relative to the valve body and an auxiliary piston member that is movable relative to the main piston member, the piston assembly either allowing or preventing fuel flow through the valve from the inlet opening towards the outlet opening depending on position of the auxiliary piston member, and a force member urging the piston assembly towards the inlet opening, wherein the piston assembly divides the fuel space into an inlet region that is upstream of the piston assembly and an outlet region that is downstream of the piston assembly, the main piston member has a first area bounding said inlet region, the auxiliary piston member has a second area bounding said inlet region, and said second area is smaller than said first area, and wherein the main piston member is movable relative to the valve body between a first end position and a second end position, the first end position being nearer than the second end position to the outlet opening, and the auxiliary piston member is movable relative to the main piston member when the main piston member is in its first end position, the piston assembly preventing fuel flow through the valve from the inlet opening towards the outlet opening when the main piston member is in its first end position and the auxiliary piston member is in an advanced position relative to the main piston member and allowing fuel flow through the valve from the inlet opening towards the outlet opening when the auxiliary piston member is in a retracted position relative to the main piston member.

* * * * *